United States Patent [19]
Brey et al.

[11] 3,859,152
[45] Jan. 7, 1975

[54] TIRE FABRIC CUTTER

[75] Inventors: Wilhelm Brey, Cuyahoga Falls, Ohio; William Hostetler, Santa Ana, Calif.; Earl Ferdnand Loeffler, Akron, Ohio; Hubert Ernest Kolm, Louisville; Fred Grove Elder, Atwater, both of Ohio

[73] Assignee: The Firestone Tire & Rubber Company, Akron, Ohio

[22] Filed: Sept. 15, 1971

[21] Appl. No.: 180,914

Related U.S. Application Data

[62] Division of Ser. No. 10,579, Feb. 11, 1970, Pat. No. 3,700,526.

[52] U.S. Cl. .................. 156/88, 156/123, 156/251, 156/256, 156/264, 156/260, 156/266, 156/405, 156/512, 156/515, 156/517, 225/95, 83/614
[51] Int. Cl. ... B29h 9/04, B29h 17/30, D03d 47/50
[58] Field of Search .......... 225/95, 94; 83/614, 353; 156/88, 250, 251, 264, 266, 260, 405, 506, 512, 517, 515

[56] References Cited
UNITED STATES PATENTS

| | | | |
|---|---|---|---|
| 1,180,363 | 4/1916 | Allatt | 225/95 |
| 1,428,420 | 9/1922 | DeMattia | 83/393 |
| 2,250,572 | 7/1941 | Cumfer | 225/94 X |
| 2,665,757 | 1/1954 | Stevens et al. | 83/358 |
| 3,192,094 | 6/1965 | Phillips et al. | 156/353 |
| 3,429,490 | 2/1969 | Cantarutti | 225/94 |
| 3,563,839 | 2/1971 | Divis | 156/250 X |

*Primary Examiner*—Clifton B. Cosby

[57] ABSTRACT

A fully automatic machine for producing "green tires" or unvulcanized tire carcasses, especially suitable for making tubeless tires. The machine comprises a plurality of interconnected and dependent assemblies or stations where specialized operations, normally done semi-automatically or by hand, are carried out by mechanical devices acting in sequence. The machine includes a plurality of conventional tire building drums continuously moving between horizontally disposed, stationary table assemblies where innerliner and chafer strips, and first and second ply material are successively wrapped on the drums as they move across the table on which the material is positioned. The wrapped drums from these assemblies, are sent to turret units where they are arcuately positioned for receiving beads, tread cushion, stitching, strips of whitewall, if required, and are discharged from the collapsed drums for removal and storage. The stripped drums, or drums from which tires are removed, are automatically expanded and recycled through the assemblies for building more tire carcasses.

2 Claims, 7 Drawing Figures

FIGS. 1-36 AND 44-97 APPEAR IN U.S. PATENT 3,700,526

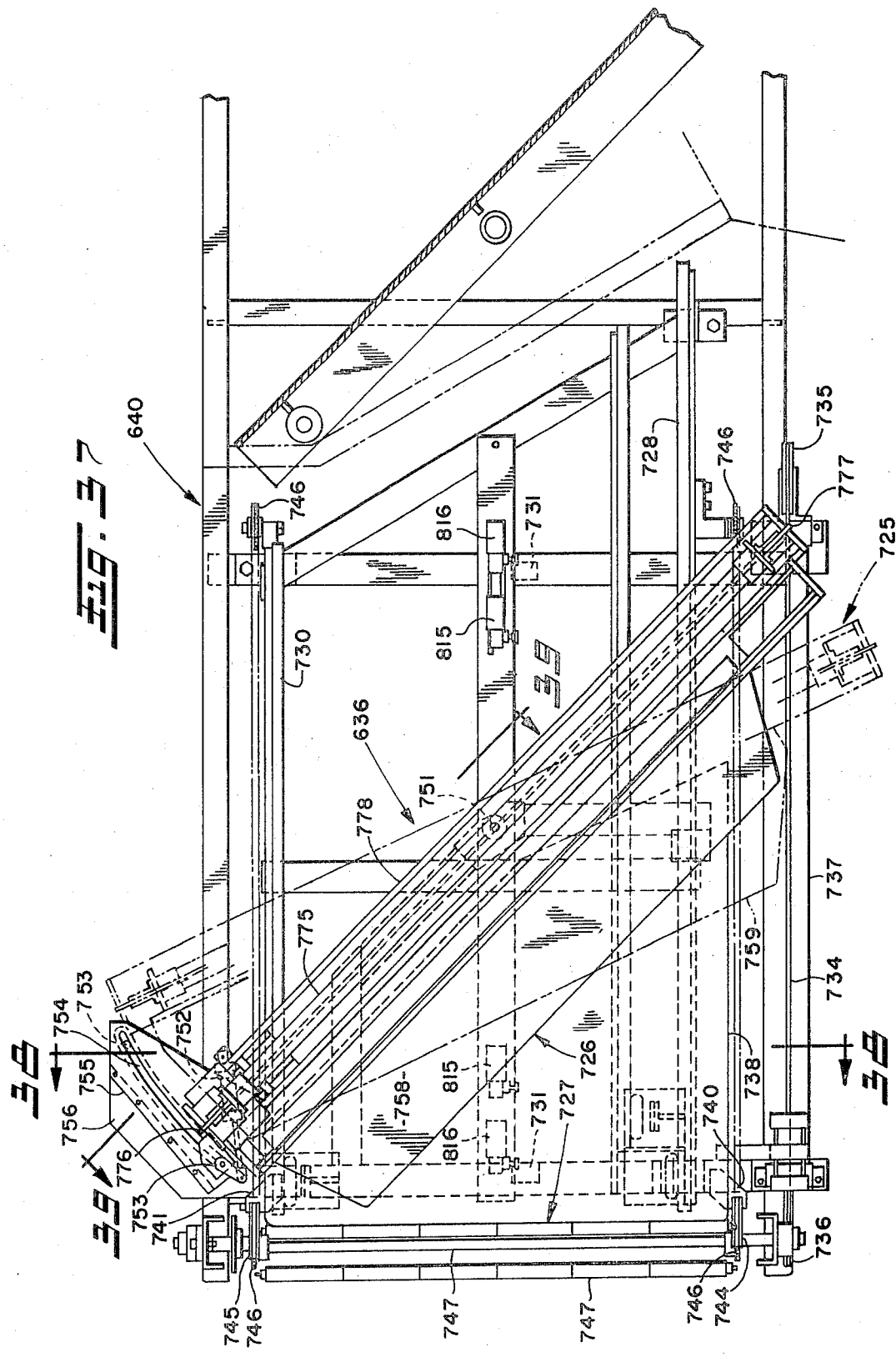

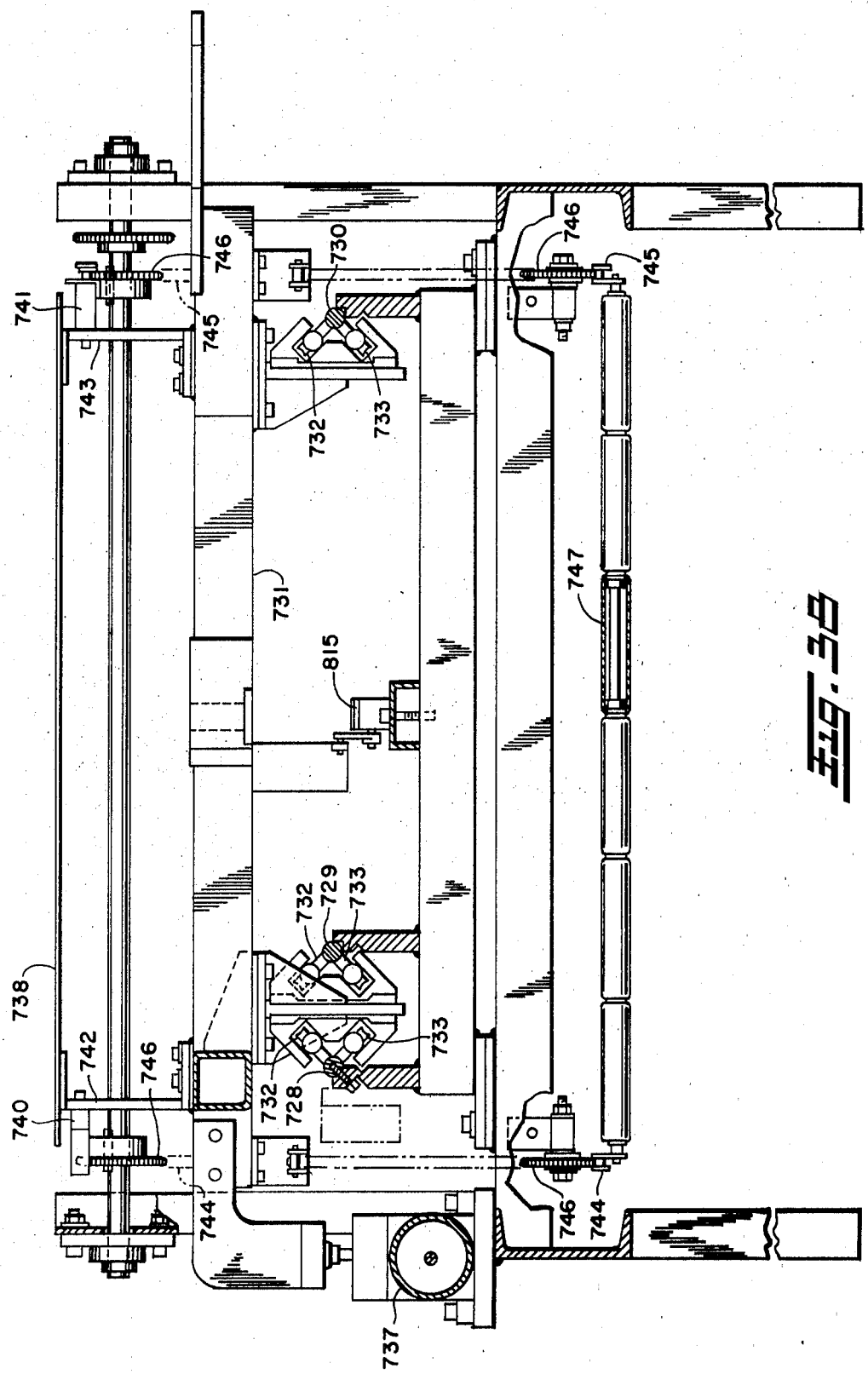

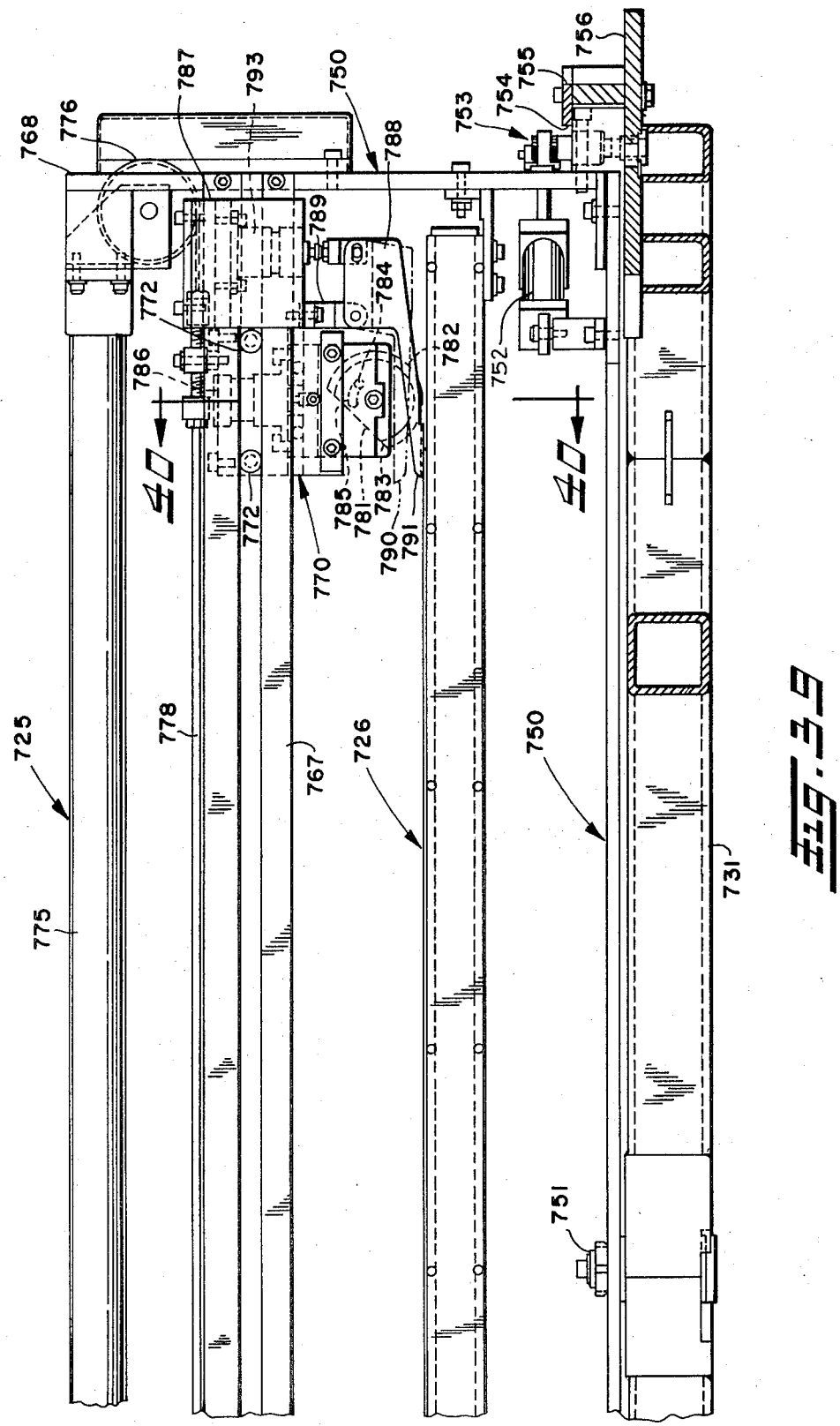

TIRE FABRIC CUTTER

This is a division of application Ser. No. 10,579, filed Feb. 11, 1970, now U.S. Pat. No. 3,700,526, the disclosure of which is hereby incorporated herein by reference, and which may be consulted for relation between the several inventive concepts of the continuing divided inventions.

DESCRIPTION OF THE FIGURES OF THE DRAWING

The following description of the invention will be better understood by referring to the annexed drawing, wherein:

FIGS. 1-36 and 44-97 appear in U.S. Pat. No. 3,700,526 and are incorporated herein by reference.

FIG. 37 is a plan view of a cutter assembly used with the first ply table assembly;

FIG. 38 is a section viewed from the line 38—38 of FIG. 37;

FIG. 39 is a section viewed from the line 39—39 of FIG. 37;

PLY CUTTER ASSEMBLY

Figure 40:
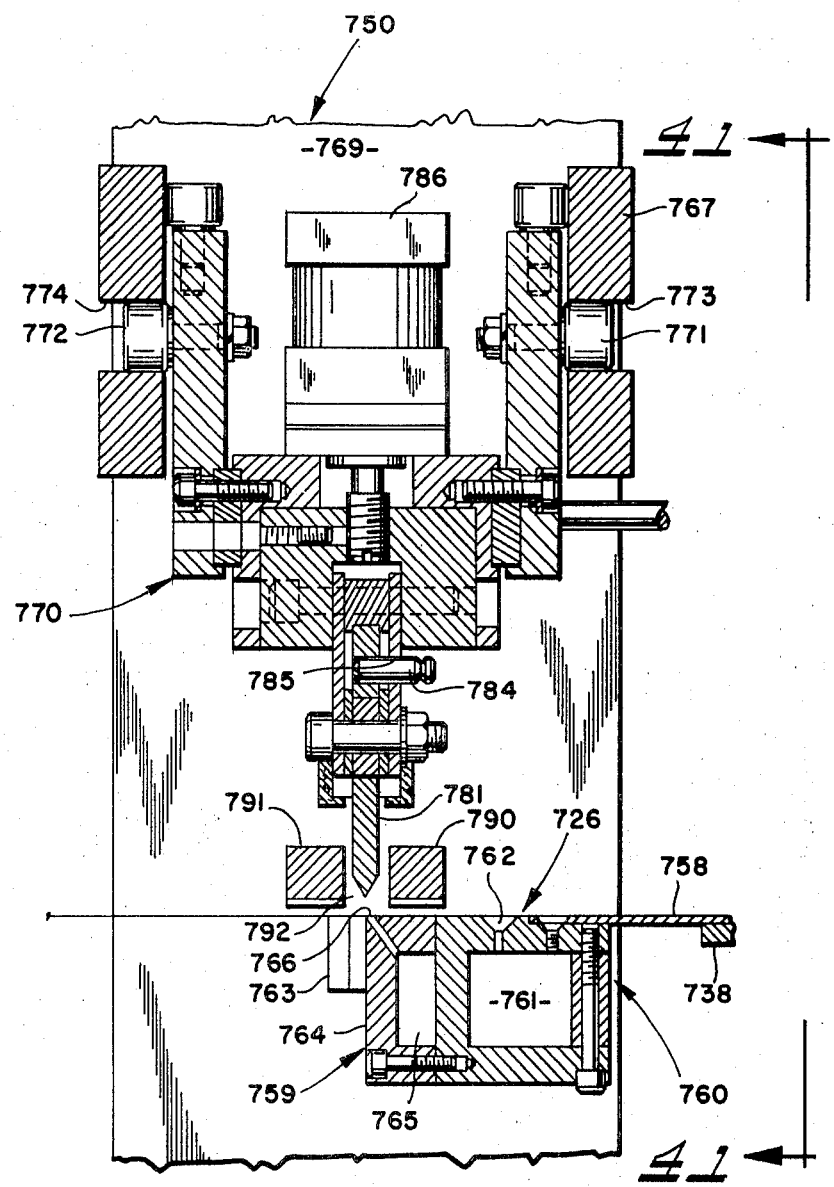
FIG. 40 is a section viewed from the line 40—40 of FIG. 39.
Figure 41:
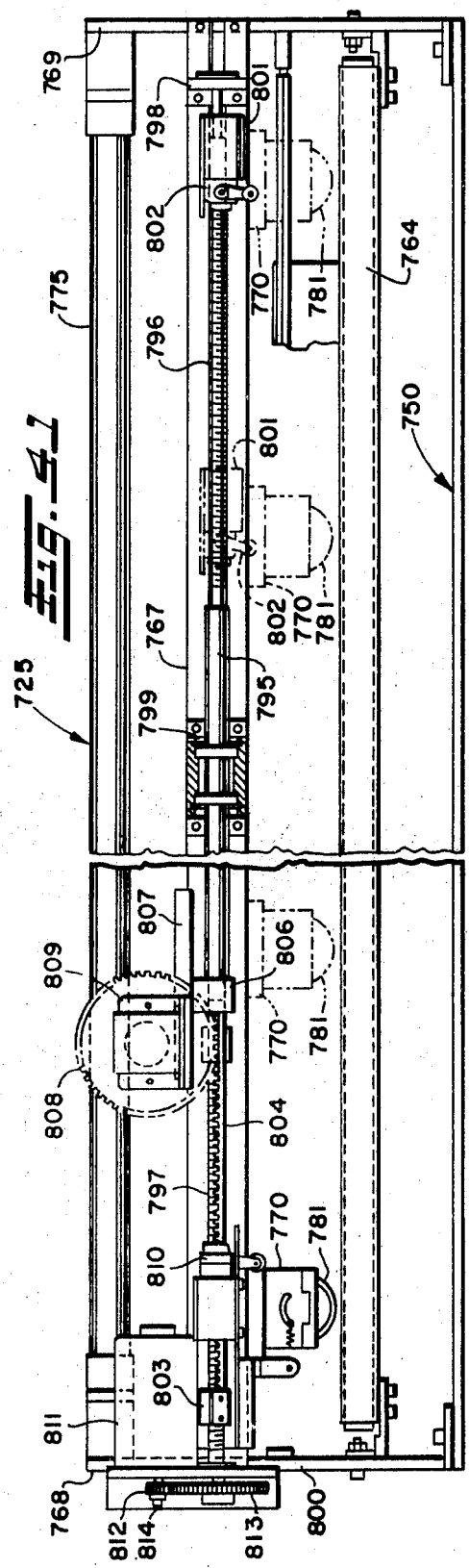
FIG. 41 is the first ply cutter assembly viewed from the line 41—41 of FIG. 40.
Figure 42:
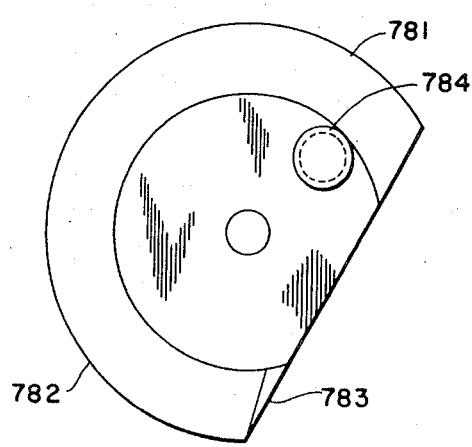
FIG. 42 is a side view of a blade or knife used in the first ply cutter assembly.
Figure 43:
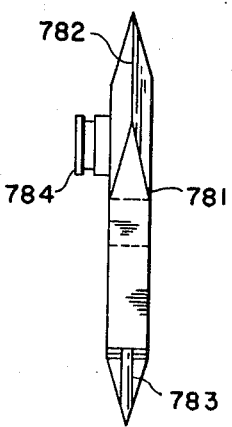
FIG. 43 is an end view of the blade or knife.

Referring generally to FIGS. 37–43 and more particularly to FIGS. 37–38, the cutter assembly 636 comprises a cutter 725, which is mounted for unitary movement with a rotatable support 726 and a trailing conveyor 727 over which the first ply moves to the horizontal bed 633.

A set of guide rails 728–730 are mounted on the 1-PLY stationary frame 640 in parallel relation below the bed 633. A cable car 731 is mounted for movement along the guide rails 728–730 by any suitable means, e.g. angularly disposed chain connected rollers 732 and 733. The cable car 731 is secured to a cable 734 which is reeved around a set of drive pulleys 735 and 736 rotatably mounted in spaced relation on the stationary frame 640. The cable 734 is secured to opposing faces of a piston reciprocable in the air cylinder 737 for operating the cable car 731.

A conveyor 727 comprises a solid table top 738 mounted on the cable car 731. A pair of brackets 740 and 741 extend from opposing sides 742 and 743 of the cable car 731. A pair of link chains 744 and 745 are secured to the outstanding brackets 740 and 741 and reeved around a set of sprocket wheels 746 which are rotatably mounted in rectangular relation on the stationary frame 640 adjacent the opposing sides 742 and 743 of the cable car 731. A plurality of similar rollers 747 are mounted in spaced relation between the link chains 744 and 745 and form a roller conveyor in trailing relation with the table top 738 mounted directly on the cable car 731.

The cutter 725 and support 726 are secured to a U-shaped cutter frame 750 which is pivotally mounted on a vertical center pin 751 carried by the cable car 731, to angularly adjust the cutter 725 and support 726 to corresponding movement of the bed sections 634 and 635. The cutter frame 750 is locked in angular position by any suitable means. For example, an air cylinder 752 carried by the cutter frame 750, is provided for operating a lock nut 753, which is normally slidable in an arcuate slot 754 formed in a bracket 755 secured to a platform extension 756 carried by the cable car 731 (FIGS. 37 and 39).

The 1-PLY support 726 (FIG. 40) comprises a counter top 758 which overlaps the table top 738 carried by the cable car 73. A blower manifold 759 and a vacuum manifold 760 are mounted in side-by-side relation on the counter top 758. The vacuum manifold 760, includes an enclosed air passageway 761 and communicating air holes 762 adjacent the leading marginal edge 763 of the counter top 758. The blower manifold 759 comprises a channel 764 disposed in sealed relation against the vacuum manifold 760, forming an air chamber 765. A plurality of aligned air jets 766 are disposed in the channel 764 in communicating relation with the air chamber 765. The blower and vacuum manifolds 759 and 760 are connected to an air hose and pump (not shown).

The cutter 725 (FIGS. 39-40) comprises a guide 767 mounted between the opposing sides 768 and 769 of the cutter frame 750. A housing 770 is suspended from the guide 767, and mounted on a set of rollers 771 and 772 which are movable along a pair of opposing guideways 773 and 774 formed in the guide 767.

An air cylinder 775 for moving the housing 770 across the 1-PLY support 726, is secured between the cutter frame sides 768 and 769 in parallel relation to the guide 767. A pair of drive pulleys 776 and 777 are rotatably mounted on the frame sides 768 and 769 adjacent the air cylinder 775. A cable 778 is reeved around the drive pulleys 776 and 777, and secured to opposing faces of a piston reciprocable in the air cylinder 775. The cable 778 is fastened to the housing 770.

A specially configured cutting blade 781 (FIGS. 39, 42–43) with a circular knife edge 782 and a blunted fabric tearing edge 783, is rotatably suspended from the housing 770. The cutting blade 781 carries a lug 784, which is movable in an arcuate slot 785 formed in the housing 770 to limit the rotation of the cutting blade 781 between the knife edge 782 and blunted edge 783. An air cylinder 786 is coupled to the cutting blade 781 for raising and lowering the blade 781 into and out of engagement with first ply material.

A support block 787 (FIG. 39-40) is mounted on the guide 767 adjacent the housing 770. A foot or clamp 788 is rotatably mounted on a bracket 789 suspended from the support block 787. The clamp 788 comprises a pair of spaced elongated fingers 790 and 791 extending beyond the cutting blade 781. The cutting blade 781 rests in a slot 792 formed between the fingers 790 and 791. An air cylinder 793 is coupled to the clamp 788 in spaced relation from the bracket 789, to rotate the fingers 790 and 791 into and out of clamping engagement with an adjacent edge of first ply material positioned on the cutter assembly 636.

What is claimed is:

1. A mechanism for cutting cord-reinforced rubber tire ply material, comprising:
    a. a clamp with paired spaced fingers for compressively engaging an adjacent edge of the material at spaced points;
    b. a blade comprising
        1. an arcuate knife edge for cutting the material edge between the points; and 2. a blunt edge adjoining the knife edge movable into the cut for tearing the material between adjoining cords;
c. means for rotating the said blade from a cutting to a tearing position;
d. means for lifting the material as the tearing proceeds; and
e. means for heating the blade.

2. A method of cutting cord-reinforced rubber tire ply material, comprising the steps of:
a. moving the material onto a bed;
b. clamping an edge of the material to the bed at two spaced points;
c. placing a cut in the edge of the material between the two points;
d. moving a blunt edge into the cut and tearing the material between adjoining cords;
e. lilting the material from the bed to facilitate tearing it; and
f. heating the rubber along the cut and torn edges to cause it to flow and seal the edges.

* * * * *